United States Patent
Lampainen et al.

(10) Patent No.: US 12,053,964 B2
(45) Date of Patent: *Aug. 6, 2024

(54) PLY OF A LINERBOARD AND A LIGHT WEIGHT LINERBOARD FOR CORRUGATED BOARD

(71) Applicant: Stora Enso OYJ, Helsinki (FI)

(72) Inventors: Seppo Lampainen, Lahti (FI); Frank Peng, Hammarö (SE); Atso Laakso, Varkaus (FI); Ari-Pekka Määttänen, Espoo (FI)

(73) Assignee: Stora Enso OYJ, Helsinki (FI)

( * ) Notice: Subject to any disclaimer, the term of this patent is extended or adjusted under 35 U.S.C. 154(b) by 655 days.

This patent is subject to a terminal disclaimer.

(21) Appl. No.: 17/256,060

(22) PCT Filed: Jun. 25, 2019

(86) PCT No.: PCT/IB2019/055350
§ 371 (c)(1),
(2) Date: Dec. 24, 2020

(87) PCT Pub. No.: WO2020/003129
PCT Pub. Date: Jan. 2, 2020

(65) Prior Publication Data
US 2021/0221114 A1 Jul. 22, 2021

(30) Foreign Application Priority Data

Jun. 27, 2018 (SE) .................... 1850799-6

(51) Int. Cl.
| | | |
|---|---|---|
| *B32B 29/00* | (2006.01) | |
| *B32B 7/12* | (2006.01) | |
| *B32B 29/08* | (2006.01) | |
| *B65D 65/40* | (2006.01) | |
| *D21H 11/02* | (2006.01) | |
| *D21H 11/10* | (2006.01) | |
| *D21H 11/18* | (2006.01) | |
| *D21H 17/00* | (2006.01) | |
| *D21H 17/28* | (2006.01) | |
| *D21H 17/45* | (2006.01) | |
| *D21H 17/68* | (2006.01) | |
| *D21H 21/18* | (2006.01) | |
| *D21H 27/10* | (2006.01) | |
| *D21H 27/40* | (2006.01) | |

(52) U.S. Cl.
CPC .............. *B32B 29/005* (2013.01); *B32B 7/12* (2013.01); *B32B 29/08* (2013.01); *B65D 65/403* (2013.01); *D21H 11/02* (2013.01); *D21H 11/10* (2013.01); *D21H 11/18* (2013.01); *D21H 17/28* (2013.01); *D21H 17/45* (2013.01); *D21H 17/68* (2013.01); *D21H 17/74* (2013.01); *D21H 21/18* (2013.01); *D21H 27/10* (2013.01); *D21H 27/40* (2013.01); *B32B 2250/03* (2013.01); *B32B 2250/26* (2013.01); *B32B 2307/546* (2013.01); *B32B 2307/718* (2013.01); *B32B 2307/72* (2013.01); *B32B 2553/00* (2013.01)

(58) Field of Classification Search
CPC ... B32B 29/005; B32B 29/08; B32B 2250/26; B32B 2307/546; B32B 2307/718; B32B 2307/72; B32B 2250/03; B65D 65/403; D21H 11/02; D21H 11/10; D21H 11/18; D21H 17/28; D21H 17/45; D21H 17/68; D21H 17/74; D21H 21/18; D21H 27/10
See application file for complete search history.

(56) References Cited

U.S. PATENT DOCUMENTS

| | | |
|---|---|---|
| 4,145,246 A | 3/1979 | Goheen et al. |
| 5,080,758 A | 1/1992 | Horng |
| 6,221,212 B1 | 4/2001 | Sjöström |
| 2003/0087066 A1 | 5/2003 | Bryden |
| 2008/0314536 A1 | 12/2008 | Peng et al. |
| 2010/0024998 A1 | 2/2010 | Wildlock et al. |
| 2011/0195231 A1* | 8/2011 | Lai .................... B32B 7/05 428/186 |
| 2017/0051456 A1 | 2/2017 | Hans et al. |
| 2021/0268783 A1 | 9/2021 | Lampainen et al. |

FOREIGN PATENT DOCUMENTS

| | | |
|---|---|---|
| CA | 1251718 | 3/1989 |
| CL | 2020003356 A1 | 7/2021 |
| SE | 445937 B | 7/1986 |
| WO | 9961701 A1 | 12/1999 |
| WO | 2015087293 A1 | 6/2006 |
| WO | 2015036930 A1 | 3/2015 |

OTHER PUBLICATIONS

Norgren, Sven et al., Strong paper from spruce CTMP—Part II: Effect of pressing at nip press temperature above the lignin softening temperature, Nordic Pulp & Paper Research Journal 2018, 33(1): 142-149.

Tillman, O., Paper and Board Grades and Their Properties In: Handbook of Paper and Board, Holik, H.: Wiley-VCH, 2006, pp. 446-466, ISBN: 978-3-527-30997-9. see p. 459.

Horn, Richard A., et al., Press drying: a way to use hardwood CTMP for high-strength paperboard, Tappi Journal, Mar. 1988.

(Continued)

*Primary Examiner* — Catherine A. Simone
(74) *Attorney, Agent, or Firm* — Greer, Burns & Crain, Ltd.

(57) ABSTRACT

The invention relates to a ply of a linerboard for corrugated board, which ply exhibits high strength properties and which enables the production of lightweight linerboards. The ply of the invention comprises 20-80 wt % CTMP from wood fibers and 80-20 wt % chemical pulp, calculated on the total fiber weight of said ply and strength additives chosen from the group of microfibrillated cellulose (MFC), anionic or cationic polymers and starch or combinations thereof. The ply exhibits a geometric SCT index of above 22 Nm/g and a density of below 680 kg/m³, preferably of below 650 kg/m³.

10 Claims, No Drawings

(56) References Cited

OTHER PUBLICATIONS

International Search Report from PCT/IB2019/055350 dated Sep. 12, 2019.
Swedish Search Report from Swedish application No. 1850799-6 dated Dec. 18, 2018.

* cited by examiner

PLY OF A LINERBOARD AND A LIGHT WEIGHT LINERBOARD FOR CORRUGATED BOARD

This application is a U.S. National Phase under 35 U.S.C. § 371 of International Application No. PCT/IB2019/055350 filed Jun. 25, 2019, which claims priority under 35 U.S.C. §§ 119 and 365 to Swedish Application No. 1850799-6, filed Jun. 27, 2018.

TECHNICAL FIELD

The present invention relates to a ply of a linerboard, a light weight linerboard comprising said ply and a corrugated board.

BACKGROUND

Corrugated board is a packaging material which can be converted to different types of packaging solutions. The corrugated board is a fiber based material comprising a corrugated medium (fluting) and at least one flat liner or linerboard attached onto a surface of the fluted medium, thus forming a sandwich structure. The central paper layer, called corrugated medium, is formed by using heat, moisture and pressure, into a corrugated shape using a corrugator. One or two flat papers, called liners, are glued to the tips of the corrugated medium. The sandwich can be formed in different ways such as in single, double, and triple walls as described in Kirwan M., J., Paper and Paperboard. Packaging Technology, Blackwell Publishing 2005.

There are different kinds of corrugated board qualities, and these might comprise different types of liners and corrugated medium. Examples of different types of liners are kraftliner, white top kraftliner and testliner. Kraftliner is typically produced from kraft pulp that can be bleached or unbleached and may comprise one or more layers wherein top layer is often optimized to provide good printing surface and good moisture resistance. Testliner is mainly produced from recycled old corrugated board and is mostly done in two layers. Kraftliners are frequently used in packaging boxes with higher demands on strength properties.

Environmental concerns have increased the demand for linerboards with lighter weight, thus consuming less raw material. However, decreasing the grammage of linerboards might affect the strength properties negatively, especially the bending stiffness, which in turn might induce problems with interflute buckling and sagging. The problem of interflute buckling occurs when the linerplies of a corrugated box buckle under load, thus weakening of the structure strength. Sagging is a result of deformation of the bottom side of a corrugated box under load. In addition, the dimension stability might also be affected, which lead to problems with washboarding and bad printability of the thereof produced corrugated board. "Washboarding" or the "wash-board effect" is an undesired effect resulting from the corrugated board manufacturing process which might become even more visible after printing of the surface. The wash-board effect is usually associated with the interfacial glue spreading/absorption and shrinkage of the glue between the liner and the fluting during drying. As the adhesive dries the liner may take up the silhouette of the flutes causing a washboard appearance.

One challenge for the linerboard maker is thus to enable the production of a lightweight liner with maintained or improved strength properties as well as resistance towards washboarding and sagging.

In multi-layered liquid packaging board, chemi-thermo-mechanical pulp (CTMP) has frequently been used in the middle ply to increase the bulk.

However, its use in linerboard has been limited since it has not been considered possible to achieve the high strength properties needed for such constructions.

U.S. Pat. No. 5,080,758 discloses a linerboard sheet made substantially solely of mechanical or chemi-mechanical pulps having a first surface layer formed from fine fibre chemimechanical pulp and a second layer formed from a mechanical or chemi-mechanical pulp at least 50% of said pulp used to form said second layer being a coarse mechanical pulp. The fine fibre pulp is formed from Western Red Cedar and the second layer formed from a mixture of Douglas Fir and Western Red Cedar. However, the strength properties, with e.g. burst indexes of only around 2 kPa·m2/g, does not make this suitable to be used as a substitute for kraft liners in all applications.

SUMMARY

It is an object of the present invention to provide a ply of a lightweight linerboard for corrugated board, which ply exhibits high strength properties and which enables the production of lightweight linerboards without the problems connected with the use of prior art lightweight linerboards in corrugated board.

The invention is defined by the appended independent claims. Embodiments are set forth in the appended dependent claims and in the following description.

In a first aspect, the invention discloses a ply of a linerboard for corrugated board, which ply comprises
  20-80 wt % CTMP from wood fibers and 80-20 wt % chemical pulp, all percentages calculated on the total fiber weight of said ply,
  strength additives chosen from the group of microfibrillated cellulose (MFC), anionic or cationic polymers and starch or combinations thereof, and which ply exhibits
  a geometric SCT index of above 22 Nm/g
  a density of below 680 kg/m$^3$, preferably of below 650 kg/m$^3$.

In normal conditions, the compression strength, which may be measured using a short-span compressive tester (SCT), usually drops drastically when the density is lowered. The inventors of the current invention has surprisingly found that, contrary to expectation, it is possible to produce a ply for use in a light-weight linerboard with low density and still achieve high compression strength. In addition, the inventive ply has further shown to be more resistance towards washboarding, interflute buckling and sagging.

In a second aspect, the invention relates to a linerboard comprising said ply, which linerboard has a basis weight of between 80-170 gsm, or between 80-165 gsm or 80-150 gsm or 80-130 gsm.

In a third aspect, the invention relates to a corrugated board comprising a corrugated medium and at least one linerboard, which linerboard comprises the ply of the first aspect.

Measurement and Evaluation Methods

The following methods and evaluation methods are referred to in the description and in the patent claims.

Freeness of the pulps refer to Canadian Standard Freeness (CSF) and is measured according to ISO 5267-2

Shopper Riegler (° SR) value is measured according to ISO 5267-1

Tensile Index is measured in accordance with ISO1924-3

Scott Bond is measured in accordance with TAPPI UM-403

Density is measured in accordance with ISO 534:2005

Bulk is measured in accordance with ISO 534:2005

Geometric SCT index is measured in accordance with ISO 9895 and is calculated as the square root of the product of the SCT index in MD and CD. The SCT index defines the compression strength of the ply or linerboard.

Burst index is measure din accordance with ISO 2759

Bending resistance is measured at an angle of 15° by use of Lorentzen & Wettre instrument in accordance with ISO 2493-1, bending length 10 mm. Geometric bending resistance index is calculated as the square root of the product of the bending resistance index in MD and CD.

Moisture content is measured in accordance with ISO 287

The grammage refers to the weight expressed as grams per square meter, gsm or g/m² and is measured in accordance with ISO 536. As used herein, gsm and g/m² may be used interchangeable.

DETAILED DESCRIPTION

The present invention relates to a ply of a linerboard, to a linerboard and to a corrugated board comprising a corrugated medium (fluting) and at least one linerboard. The corrugated fiberboard is manufactured from pulps comprising cellulosic fibers. The corrugated board preferably comprises at least two linerboards (liners) and at least one corrugated medium. The corrugated board may also comprise more than one corrugated mediums and more than two liners. The liner is attached to at least one surface of the corrugated medium by an adhesive. The linerboard of the present invention is intended to be used as a light-weight substitute to kraft liners and thus in high quality corrugated board.

CTMP as used herein is meant to define chemi-thermo mechanical pulp of cellulosic fibers. CTMP is normally produced by impregnating wood chips with sodium sulphite before grinding. The CTMP used in accordance with the invention is preferably produced from softwood and is preferably unbleached.

The ply of the invention comprises 20-80 wt % CTMP from wood fibers, calculated on the total fiber weight of said ply and specific strength additives, whereby a ply with a geometric SCT index of above 22 Nm/g and a density of below 680 kg/m³ may be provided. In some embodiments, the SCT index of the ply is above 24 Nm/g or even above 25 Nm/g. In some embodiments, the density of the ply according to the invention may be below 650 kg/m³ or below 630 kg/m³, or below 620 or even below 610 kg/m³. The density of the ply may e.g. be between 550-680 kg/m³, or 550-650 kg/m³, or 600-650 kg/m³.

In one embodiment of the invention, the first ply comprises 20-80 wt % CTMP, or 20-70 wt % CTMP, or 30-80 wt % CTMP or 30-70 wt % CTMP, or at least 40 wt % CTMP or 40-80 wt % CTMP or 40-70 wt % CTMP calculated on the total fiber weight of said ply. The remaining pulp may be bleached or unbleached chemical pulp, preferably kraft pulp, most preferably kraft pulp from virgin fibers from hardwood or softwood. In one embodiment, the ply may further comprise recycled fibers, such as recycled fibers from OCC in an amount of e.g. 0-30 wt %.

The first ply of the invention may exhibit a geometric average bending resistance index of at least 150 $Nm^6/kg^3$, preferably at least 170 $Nm^6/kg^3$, most preferably at least 180 $Nm^6/kg^3$ and/or a geometric SCT index of at least 22 Nm/g, preferably at least 24 Nm/g or at least 25 Nm/g. In addition, said first ply may exhibit a burst index of at least 2.5 $kPam^2/g$, preferably at least 3 $kPam^2/g$ and a Scott Bond of at least 150 J/m², preferably at least 180 J/m² or at least 200 or even at least 250 J/m².

The strength additives are chosen from the group of microfibrillated cellulose (MFC), anionic or cationic polymers or starch or combinations thereof. The anionic and/or cationic polymer is preferably chosen from the group of carboxymethyl cellulose (CMC), anionic polyacrylamide (APAM) or cationic polyacrylamide (CPAM) or combinations thereof. MFC may be added in an amount of between 0.1-10 wt %, preferably between 1-7 wt %, or between 1-5 wt % as calculated on the total solid content of the ply where MFC is added. Starch, preferably cationic starch, may be added in an amount of 0.5-5 wt %, preferably in an amount of 1-3 wt %. Anionic or cationic polymers, such as CMC, APAM or CPAM, may be added in an amount of 0.1-1 wt %, preferably 0.1-0.5 wt %. In one embodiment, the linerboard comprises MFC. The linerboard may comprise MFC and starch or MFC and anionic or cationic polymer. Preferably, the additives are pre-mixed before added to the pulp furnish.

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods.

The smallest fibril is called elementary fibril and has a diameter of approximately 2-4 nm (see e.g. Chinga-Carrasco, G., Cellulose fibres, nanofibrils and microfibrils: The morphological sequence of MFC components from a plant physiology and fibre technology point of view, Nanoscale research letters 2011, 6:417), while it is common that the aggregated form of the elementary fibrils, also defined as microfibril (Fengel, D., Ultrastructural behavior of cell wall polysaccharides, Tappi J., March 1970, Vol 53, No. 3), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the final specific surface area of the formed MFC is from about 1 to about 300 m2/g, such as from 1 to 200 m2/g or more preferably 50-200 m2/g when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CM), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size fibrils.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, single- or twin-screw extruder, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated.

MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or chemi-mechanical pulps. It can also be made from broke or recycled paper.

The above described definition of MFC includes, but is not limited to, the new proposed TAPPI standard W13021 on cellulose nanofibril (CNF) defining a cellulose nanofiber material containing multiple elementary fibrils with both crystalline and amorphous regions.

In one embodiment of the invention, the CTMP has a bulk of at least 2.5 cm$^3$/g, preferably at least 3 cm$^3$/g, most preferably at least 3.5 cm$^3$/g. The use of CTMP with high bulk makes it possible for the linerboard producer to reduce the grammage of the linerboard and still avoid problems with washboarding in the thereof produced corrugated board. The high bulk of the CTMP may be ensured by regulating the amount of added strength additives and by adjusting the refining of the CTMP. The skilled person is well aware of how adjust the bulk of CTMP. For example, the bulk can be adjusted by refining to different freeness in HC refining (high consistency refining) of the CTMP pulp. HC refining can further be done at high temperature to achieve HT-CTMP. Alternatively the CTMP pulp may be further LC refined in the CTMP line or at the paperboard machine.

In one embodiment, the CTMP used in the linerboard of the invention has a freeness of at least 300 ml, preferably of between 300-700 ml, or between 350-700 ml or 400-700 ml or 500-700 ml. It has surprisingly been shown that high freeness CTMP can be used to produce light-weight linerboards without compromising the strength properties. In addition to enabling savings in energy, a high freeness pulp may also provide a high bulk, which has been found to also diminish problem with washboarding and interflute buckling.

The strength properties of CTMP from spruce are much weaker compared to unbleached kraft pulp, which is shown in table 1 below wherein the tensile index and the scott bond of CTMP refined to different freeness is shown in comparison with unbleached kraft pulp (UKP) from softwood. The properties of the pulps are shown in table 1.

Thus, the skilled person would not from the knowledge of the strength properties for CTMP in comparison with unbleached kraft pulp believe that it is possible to produce a high strength linerboard with high amount of CTMP. However, contrary to the expectation, the inventors to this invention have shown this possible.

TABLE 1

| properties of CTMP and UKP | | | |
|---|---|---|---|
| | CTMP unref | CTMP 200 | UKP |
| Freeness [CSF] | 540 | 340 | |
| Shopper Riegler (SR) | | | 21 |
| Tensile index [Nm/g] | 24.6 | 34.9 | 76 |
| Scott Bond [J/m2] | 80 | 150 | 580 |
| Density [kg/m$^3$] | 303 | 390 | 565 |
| Bulk [cm$^3$/g] | 3.3 | 2.6 | 1.8 |

The invention further defines a linerboard comprising the ply described above, which linerboard has a basis weight of below 230 gsm, preferably of below 200 gsm or below 150 gsm or below 130 gsm. The basis weight of the linerboard may e.g. be between 80-230 gsm, or between 80-150 gsm or 80-130 gsm.

In one embodiment, the above disclosed ply forms a first ply and the linerboard comprises a further second ply which second ply comprises 0-70 wt % CTMP and 30-100 wt % chemical pulp, such as kraft pulp, calculated on the total fiber weight of said second ply. In one embodiment, said second ply may comprise 100 wt % chemical pulp, which may be bleached or unbleached. Preferably, said second ply forms a top ply on the print side of the thereof produced corrugated board.

The linerboard of the invention may further comprise a third ply, which third ply comprises 0-70 wt % CTMP and 30-100 wt % chemical pulp and wherein said second ply forms a top ply, said first ply forms a middle ply and said third ply forms a back ply. In the thereof produced corrugated board, said top ply forms the print side and said back ply is to be in contact or facing against the corrugated medium. This three-ply embodiment enables the production of linerboard with even lower grammages, but still provide a high bending stiffness and high resistance to interfulte buckling and wash-boarding. In one embodiment, said third ply also comprises at least 20 wt % CTMP or at least 30 wt % CTMP, e.g. between 20-70 wt % CTMP or 30-70 wt % CTMP. The advantage of having CTMP in the back ply is that it has shown to improve hydrophobicity, which diminishes the washboard effect even further.

In one embodiment, both said second and said third ply, forming the surface plies of the linerboard, comprise 100 wt % chemicalpulp calculated on the total fiber weight of said layers. In this way, an I beam structure is achieved which enhances the strength properties even further.

The linerboard of the invention may further comprise further plies, such as a fourth ply, arranged as a middle ply, between said second and third plies. Such further plies may comprise any kind of fibers or pulp combinations.

The linerboard of the invention may exhibit a bending resistance index according to ISO 2493-1 of at least 170 Nm6/kg3, or at least 175 Nm6/kg3 or at least 180 Nm6/kg3 or even at least 185 Nm6/kg3. The linerboard of the invention may further exhibit a density of below 710 kg/m$^3$, preferably below 700 kg/m$^3$ or below 680 kg/m$^3$.

Example

In order to evaluate the linerboard and the ply of the invention, a test series was performed in which a ply made from 100 wt % unbleached kraft pulp (UKP) (ref, 1) from pine was compared with plies made from a mixture of UKP and different amounts of CTMP (2-6) and different amounts and combinations of the strength additives. The properties of the pulps (UKP, CTMP unrefined and CTMP 200) used in this trial are shown in table 1 above. In addition, strength additives were added in different amounts and combinations to the different furnishes. Table 2 shows the content of the furnishes used to produce ply 1 (ref) and ply 2-6 (invention). The content of UKP and CTMP respectively is expressed as wt % as calculated on the total fiber weight.

The plies were made on a pilot machine where the furnish was applied on a wire of the forming section followed by press section and drying section and further calandered using a line load of 50 kN/m.

TABLE 2

| Trial Point | 1 (ref) | 2 | 3 | 4 | 5 | 6 |
|---|---|---|---|---|---|---|
| UKP [wt %] | 100 | 60 | 40 | 60 | 60 | 60 |
| CTMP unref [wt %] | | | | 40 | | |
| CTMP 200 [wt %] | | 40 | 60 | | 40 | 40 |
| Starch [g/t] | | 10 | 10 | 10 | 20 | 40 |
| MFC [wt %] | | 5 | 5 | 5 | | |
| CMC [kg/t] | | | | | | 4 |
| C-PAM [g/t] | 150 | 150 | 150 | 150 | 150 | 150 |
| Silica [g/t] | 650 | 650 | 650 | 650 | 650 | 650 |
| AKD [kg/t] | 1.5 | 1.5 | 1.5 | 1.5 | 1.5 | 1.5 |

Table 3 shows the measured properties of the produced plies 1-6, including geometric SCT index, burst index, Scott bond (MD), Bending resistance index (GM). The physical testing was done at 50% RH 23° C., unless otherwise stated.

As can be seen in table 3, the strength properties SCT, burst index and scott bond are comparable or even improved in the inventive ply, while the density is significantly lowered. Particularly remarkable is that the use of unrefined CTMP (sample 4) still shows such high strength properties. The results show that the SCT index for plies made in accordance with the invention does not decrease with lower densities, which is contrary to prevailing assumptions.

The moisture content of the reference board comprising 100 wt % UKP is significantly higher at 90% RH. Thus, the paperboard of the invention has a more hydrophobic nature and thus much more resistant to washboarding.

TABLE 3

| Trial point | 1 (ref) | 2 | 3 | 4 | 5 | 6 |
|---|---|---|---|---|---|---|
| Grammage (g/m2) | 129.3 | 127.7 | 128.5 | 129.2 | 129.2 | 127.3 |
| Density [kg/m$^3$] | 725 | 657 | 622 | 622 | 603 | 627 |
| SCT (geometric) [Nm/g] | 24.8 | 26.9 | 26.7 | 24.3 | 24.5 | 26.7 |
| Burst index [kPam2/g] | 3.7 | 3.3 | 3.0 | 3.5 | 3.3 | 4.0 |
| Scott Bond MD [J/m2] | 277 | 341 | 319 | 307 | 291 | 336 |
| Bending resistance index 15°, GM [Nm$^6$/kg$^3$] | 143 | 167 | 185 | 177 | 190 | 196 |
| Moisture content [wt %] at 23° C., 90% RH | 7.8 | 7.8 | 7.8 | 7.6 | 7.6 | 7.9 |
| Moisture content [wt %] at 23° C., 90% RH | 20.7 | 17.1 | 16.9 | 16.3 | 16.7 | 16.8 |

The invention claimed is:

1. A linerboard for corrugated board, the liner board comprising:
   a first ply forming a middle ply, a second ply forming a top ply and a third ply forming a back ply,
   wherein the first ply comprises
      20-80 wt % CTMP from wood fibers and 80-20 wt % chemical pulp, calculated on a total fiber weight of the first ply, and,
      one or more strength additives chosen from a group consisting of: microfibrillated cellulose (MFC), anionic polymers, cationic polymers, starch, and combinations thereof, and wherein the ply exhibits
   a geometric SCT index of above 22 Nm/g, and,
   a density of below 680 kg/m$^3$,
   wherein the second ply comprises 100 wt % chemical pulp, calculated on a total fiber weight of the second ply, and
   wherein said third ply comprises 20-70 wt % CTMP and 30-80 wt % chemical pulp, calculated on a total fiber weight of the third ply,
   wherein said linerboard has a basis weight between 80 to 150 gsm.

2. The linerboard according to claim 1, wherein said first ply exhibits a geometric average bending resistance index according to ISO 2493-1, using a bending length 10 mm, of at least 150 Nm$^6$/kg$^3$.

3. The linerboard according to claim 1, wherein said first ply comprises MFC in an amount of from 0.1-10 wt %, calculated on a total solid content of the first ply.

4. The linerboard according to claim 1, wherein said first ply comprises starch in an amount in a range of 0.5-15 wt %, calculated on a total solid content of the first ply.

5. The linerboard according to claim 1, wherein said first ply comprises anionic or cationic polymers in an amount in a range of 0.05-2 wt %.

6. The linerboard according to claim 1, wherein the CTMP has a bulk of at least 2.5 cm$^3$/g.

7. The linerboard according to claim 1, wherein the CTMP has a freeness of at least 300 ml.

8. The linerboard according to claim 1, wherein a density of the linerboard is below 710.

9. A corrugated board comprising:
   a corrugated medium and the linerboard according to claim 1.

10. The linerboard according to claim 1, wherein the density of the first ply is below 650 kg/m$^3$.

* * * * *